United States Patent [19]

Santoh et al.

[11] Patent Number: 5,271,979
[45] Date of Patent: Dec. 21, 1993

[54] OPTICAL RECORDING MEDIUM CONTAINING POLYMETHINE COMPOUND

[75] Inventors: Tsuyoshi Santoh, Yokohama; Hiroyuki Sugata, Yamato; Chieko Mihara, Isehara, all of Japan

[73] Assignee: Canon Kabushiki Kaisha, Tokyo, Japan

[21] Appl. No.: 873,809

[22] Filed: Apr. 27, 1992

[30] Foreign Application Priority Data

May 1, 1991 [JP]  Japan .................. 3-126527

[51] Int. Cl.$^5$ .............................................. B32B 3/02
[52] U.S. Cl. ....................................... 428/64; 428/65; 428/913; 346/76 L; 369/288; 430/945
[58] Field of Search .................. 428/64, 65, 913; 346/76 L; 369/288; 430/945

[56] References Cited

U.S. PATENT DOCUMENTS

| | | | |
|---|---|---|---|
| 4,923,390 | 5/1990 | Oguchi et al. | 430/270 |
| 4,944,981 | 7/1990 | Oguchi et al. | 428/64 |
| 5,009,987 | 4/1991 | Mihara et al. | 430/495 |
| 5,079,128 | 1/1992 | Katagiri et al. | 430/269 |
| 5,108,873 | 4/1992 | Fukui et al. | 430/270 |

FOREIGN PATENT DOCUMENTS 0026879  1/1989  Japan .

OTHER PUBLICATIONS

Schmidt et al., Annalen der Chemie, vol. 623 (1959) 204:16.
Helvetica Chimica Acta, vol. 24 (1943) 369:88.
Tuemmler et al., J. Am. Chem. Soc., vol. 80 (1958) 3772:7.
Bartolini et al., Optical Engineering, vol. 15, No. 2 (1976) 99:108.

*Primary Examiner*—Patrick J. Ryan
*Assistant Examiner*—Marie R. Macholl
*Attorney, Agent, or Firm*—Fitzpatrick, Cella, Harper & Scinto

[57] ABSTRACT

An optical recording medium including a recording layer containing a polymethine compound which can be expressed by the following formula:

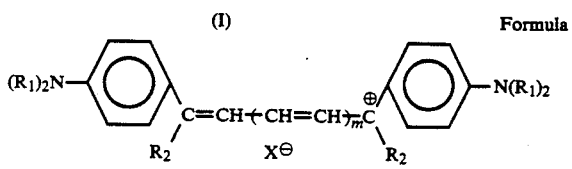

where $R_1$ and $R_2$ represent aryl groups substituted by alkyl groups, or aryl groups substituted by alkoxy groups; $R_3$ and $R_4$ represent substituted or unsubstituted aryl groups, substituted or unsubstituted heterocyclic groups, or substituted or unsubstituted styryl groups; m is 0, 1 or 2; and $X^{\ominus}$ is an anion.

12 Claims, 1 Drawing Sheet

OPTICAL RECORDING MEDIUM CONTAINING POLYMETHINE COMPOUND

BACKGROUND OF THE INVENTION

1. Field of the Invention

The present invention relates to an optical recording medium and, more specifically, to a record blank suitable for recording information with a laser beam, in particular, a semiconductor laser beam, and to an information record allowing optical reproduction of information recorded by a laser beam.

2. Description of the Related Art

Generally, information can be recorded on an optical recording medium, such as a series of optical discs or optical cards, by forming an optically detectable minute pits (for example, of approximately 1 μm) arranged in such a manner as to define a spiral, concentric or linear track on a recording layer formed on a substrate of the recording medium, thereby making it possible to store information at high-density.

As described, for example, in "Review and Analysis of Optical Recording Media" of *Optical Engineering*, Vol.15, No.2, March-April 1976, pp99~, a known optical recording method consists in applying a light beam, such as a laser beam, to the recording layer of an optical recording medium so as to generate deformation or pits on the recording layer. In other known methods, the application of such a light beam causes the generation of bubbles, changes in phase, discoloration, discolorization or the like.

Various materials have been proposed for the recording layer of such an optical recording medium. Examples of such materials include inorganic materials, such as a metal film consisting of an aluminum deposit film or the like, a bithmuth film, a tellurium oxide film, or a chalcogenite-type non-crystalline glass film. Generally, such thin films are sensitive to light having a wavelength of approximately 350 to 800 nm and exhibit high reflectance to laser beams. One disadvantage of these films is that they provide a rather poor laser-beam-utilization factor. Further, such an inorganic material thin film is usually formed as a recording layer by sputtering or the like. Such a film formation method, however, requires a production line equipped with a vacuum system, so that these inorganic material thin films have higher production costs.

In view of the above problems, optical recording mediums using organic coloring matter whose optical properties can be changed by the energy of light having a relatively long wavelength (for example, 780 nm or more) are being carefully studied. Optical recording mediums using such organic coloring matter are effective in that they allow the formation of pits by a semiconductor laser having an oscillation wavelength of around 780 nm or 830 nm. Further, organic coloring matter allows film formation by wet coating and can be easily treated, making it possible to easily mass-produce recording mediums on equipment costing less.

In this context, for example, in Japanese Patent Laid-Open No.1 -26879, an optical recording medium which uses a polymethine dye for the recording layer and which allows high S/N recording by a semiconductor laser and exhibits satisfactory heat stability is shown.

As stated above, employment of an organic coloring matter for the recording layer helps to reduce production costs of optical recording mediums because it allows film formation by wet coating. Such an organic coloring matter, however, must exhibit a maximum absorptivity in a range near the wavelength of the recording light beam, excellent heat stability, and high solubility in solvent. In a case where an organic coloring matter having poor solubility in solvent is used, a slight change in the concentration of the solution to be applied would likely cause solid particles, e.g., minute crystals of the organic coloring matter, in the solution. In that case, a wet coating process would lead to mixing the solid particles in the solution for preparing recording layers to the recording layer, resulting in low-quality optical recording mediums exhibiting a high noise level at the time of reproduction.

SUMMARY OF THE INVENTION

The present invention has been made in view of the above problems. It is an object of this invention to provide an optical recording medium comprising a recording layer containing an organic coloring matter exhibiting high absorptivity to light having a wavelength range of 600–1200 nm, excellent stability even under high-temperature/humidity conditions, and further, improved solubility in solvent, and which has high recording sensitivity, excellent durability, and allows reproduction of recorded information at a high S/N ratio.

In accordance with the present invention, there is provided an optical recording medium comprising a recording layer containing a polymethine compound which is shown by the following formula (I):

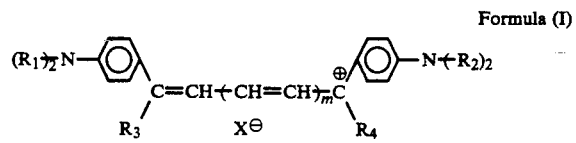

Formula (I)

(where R1 and R2 represent aryl groups substituted by alkyl groups, or aryl groups substituted by alkoxy groups; R3 and R4 represent substituted or unsubstituted aryl groups, substituted or unsubstituted heterocyclic groups, or substituted or unsubstituted styryl groups; m is 0, 1 or 2; and X $\ominus$ represents an anion).

In accordance with the present invention, the polymethine compound expressed by formula (I) exhibits high absorptivity to light having a wavelength in the near-infrared range, and having excellent solubility in solvent. Further, the polymethine compound exhibits a high oxidization potential in cyclic voltammetry, and is relatively free from deterioration by oxidization. Thus, it is expected that the polymethine compound makes it possible to obtain an optical recording medium exhibiting high recording sensitivity with respect to semiconductor lasers, with excellent durability, and allowing the reproduction of recorded information at a high S/N ratio.

DETAILED DESCRIPTION OF THE INVENTION

Figure 1:
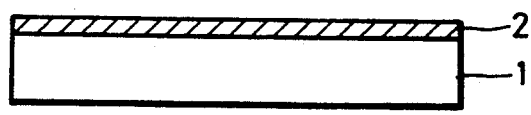
FIG. 1 is a schematic sectional view of an optical recording medium according to an embodiment of the present invention.

The present invention will now be described in detail.

The optical recording medium of the present invention has a recording layer which absorbs electromagnetic radiation to record information as a result of thermal action causing optical changes. The recording layer contains a polymethine compound which is shown by the following formula:

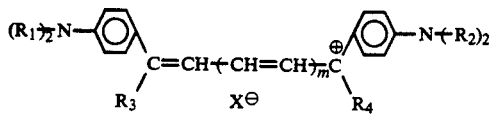

Formula (I)

In the above formula (I), R1 and R2 represent, for example, aryl groups which are substituted by substituted or unsubstituted alkyl groups as shown in the following formula (II), or aryl groups which are substituted by substituted or unsubstituted alkoxy groups as shown in the following formula (III):

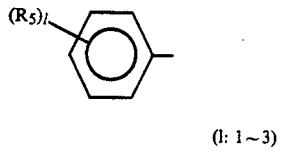

Formula (II)

(l: 1~3)

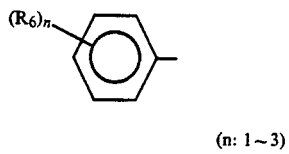

Formula (III)

(n: 1~3)

In the above formula (II), R5 represents a substituted or unsubstituted alkyl group. Examples of the alkyl group include: methyl group, ethyl group, n-propyl group, iso-propyl group, n-butyl group, sec-butyl group, iso-butyl group, t-butyl group, n-amyl group, t-amyl group, n-hexyl group, n-octyl group, and t-octyl group.

Examples of the substituted alkyl group includes: 2-hydroxyethyl group, 3-hydroxypropyl group, 4-hydroxy butyl group, 2-acetoxyethyl group, carboxymethyl group, 2-carboxyethyl group, 3-carboxypropyl group, 2-sulfoethyl group, 3-sulfopropyl group, 4-sulfobutyl group, 3-propylsulfate group, 4-butylsulfate group, N-(methylsulfonyl)-carbamylethyl group, 3-(acetylsulfamyl) propyl group, and 4-(acetylsulfamyl) butyl group. Further, the alkyl group may be cyclic, for example, be a cyclohexyl group or the like.

When an aryl group is bonded with a plurality of alkyl groups, the mutual alkyl groups may be the same or differ from each other.

In the above formula (III), R represents a substituted or unsubstituted alkoxy group. Specifically, it may be a methoxy group, ethoxy group, propoxy group or the like.

Further, when, in formulas (II) and (III), R5 and R6 are linear or branched substituted or unsubstituted lower alkyl groups of a carbon number ranging from 1 to 3, or alkoxy groups bonded with substituted or unsubstituted lower alkyl groups, these compounds exhibiting an optimum solubility in solvent. The resulting layer exhibits a satisfactory environmental stability, indicating that compounds with such substituent groups are especially suitable for forming the optical recording medium of the present invention. Examples of such lower alkyl groups and alkoxy groups include: methyl group, ethyl group, n-propyl group, iso-propyl group, methoxy group, ethoxy group, n-propoxy group, and iso-propoxy group.

Next, R3 and R4 may represent: substituted or unsubstituted aryl groups (for example, phenyl groups, naphthyl groups, tolyl groups, xylyl groups, methoxyphenyl groups, dimethoxyphenyl groups, trimethoxyphenyl groups, ethoxyphenyl groups, dimethylaminophenyl groups, diethylaminophenyl groups, dipropylaminophenyl groups, dibenzylaminophenyl groups, diphenylaminophenyl groups, or ditolylaminophenyl groups, dimethoxyaminophenyl groups etc.); substituted or unsubstituted heterocyclic groups (for example, pyridyl groups, quinolyl groups, lepidyl groups, methylpyridyl groups, furyl groups, thienyl groups, indolyl groups, pyrrole groups, carbazolyl groups, or N-ethylcarbazolyl groups); or substituted or unsubstituted styryl groups (for example, styryl groups, methoxystyryl groups, dimethoxystyryl groups, trimethoxystyryl groups, ethoxystyryl groups, dimethylaminostyryl groups, diethylaminostyryl groups, dipropylaminostyryl groups, dibenzylaminostyryl groups, diphenylaminostyryl groups, 2,2-diphenylvinyl groups, 2-phenyl-2-methylvinyl groups, 2-(dimethylaminophenyl)-2-phenylvinyl groups, 2-(diethylaminophenyl)-2-phenylvinyl groups, 2-(dibenzylaminophenyl)-2-phenylvinyl groups, 2,2-di(diethylaminophenyl) vinyl groups, 2,2-di(methoxyphenyl) vinyl groups, 2,2-(ethoxyphenyl) vinyl groups, 2-(dimethylaminophenyl)-2-methylvinyl groups, or 2-(diethylaminophenyl)-2-ethylvinyl groups).

The number m is 0, 1 or 2.

Further, the symbol X $\ominus$ represents an anion, such as a chlorine ion, bromine ion, iodine ion, perchlorate ion, nitrate ion, benzenesulfonate ion, p-toluenesulfonate ion, methylsulfate ion, ethylsulfate ion, propylsulfate ion, tetrafluoroborate ion, tetraphenylborate ion, hexafluorophosphate ion, benzenesulfonate ion, acetate ion, trifluoroacetate ion, propionacetate ion, benzoate ion, oxalate ion, succinate ion, malonate ion, oleate ion, stearate ion, citrate ion, 1-hydrogen-2-phosphate ion, 2-hydrogen-1-phosphate ion, pentachlorostannate ion, chlorosulfonate ion, fluorosulfonate ion, trifluoromethanesulfonate ion, hexafluoroarsenate ion, hexafluoroantimonate ion, molybdate ion, tungstate ion, titanate ion, or zirconate ion.

The following are specific examples of the polymethine-type dyes used in the present invention, which, however, should not be construed restrictively.

| Compound No. | $R_1, R_2$ | $R_3, R_4$ | m | X |
|---|---|---|---|---|
| 1 | 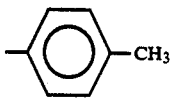 | 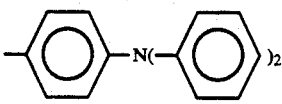 | 1 | $ClO_4$ |
| 2 | 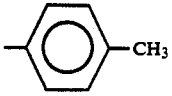 | 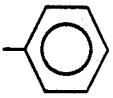 | 1 | $ClO_4$ |
| 3 | 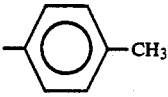 | 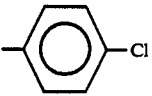 | 1 | $BF_4$ |
| 4 | 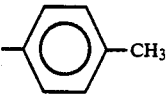 | 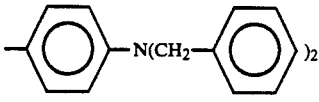 | 1 | $ClO_4$ |
| 5 | 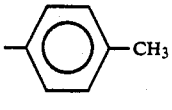 | 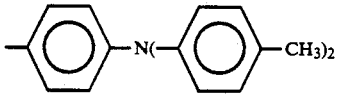 | 1 | $ClO_4$ |
| 6 | 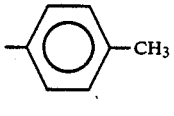 | 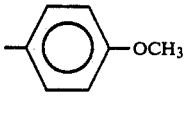 | 1 | I |
| 7 | 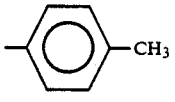 | 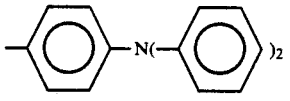 | 0 | $ClO_4$ |
| 8 | 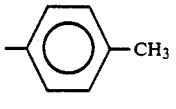 | 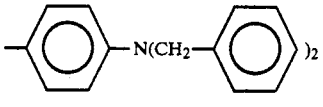 | 0 | $ClO_4$ |
| 9 | 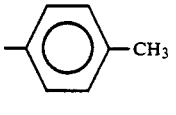 | 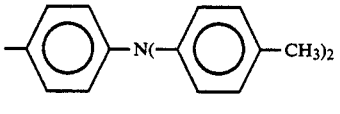 | 0 |  |
| 10 | 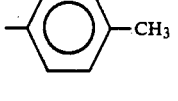 | 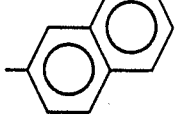 | 2 | $ClO_4$ |
| 11 | 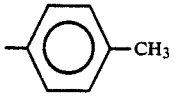 | 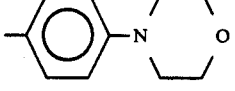 | 1 | $ClO_4$ |
| 12 | 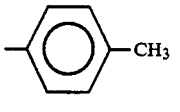 | 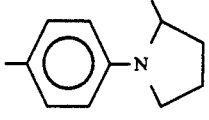 | 1 | $ClO_4$ |
| 13 | 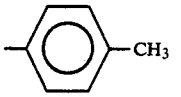 | 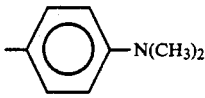 | 1 | $ClO_4$ |

-continued
| Compound No. | R₁, R₂ | R₃, R₄ | m | X |
|---|---|---|---|---|
| 14 | 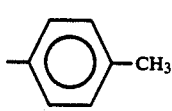 | 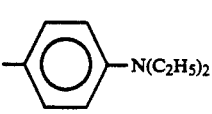 | 1 | ClO₄ |
| 15 | 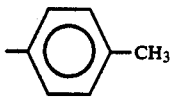 | 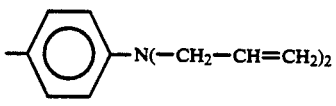 | 1 | ClO₄ |
| 16 | 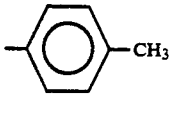 | 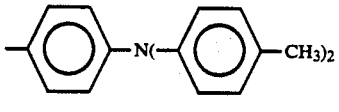 | 1. | SbF₆ |
| 17 | 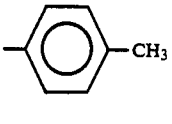 | 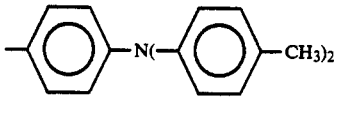 | 0 | ClO₄ |
| 18 | 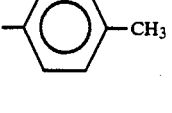 | 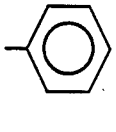 | 1 | SbF₆ |
| 19 | 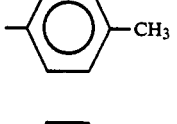 | 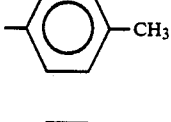 | 1 | ClO₄ |
| 20 |  | 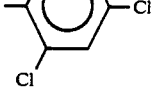 | 1 | ClO₄ |
| 21 | 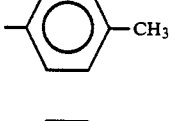 | 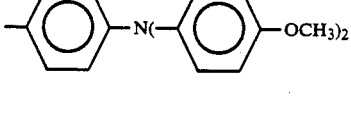 | 1 | ClO₄ |
| 22 | 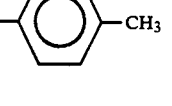 | 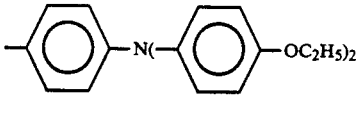 | 1 | ClO₄ |
| 23 | 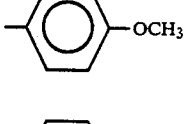 | 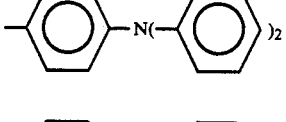 | 1 | ClO₄ |
| 24 | 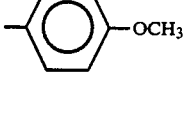 | 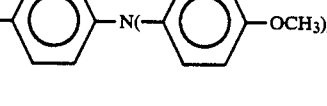 | 1 | ClO₄ |
| 25 | 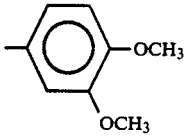 | 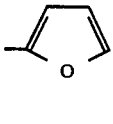 | 1 | ClO₄ |

-continued

| Compound No. | R₁, R₂ | R₃, R₄ | m | X |
|---|---|---|---|---|
| 26 | 3,4,5-tri(OCH₃)-phenyl | 3,4-di-Cl-phenyl | 0 | ClO₄ |
| 27 | 4-OC₂H₅-phenyl | 4-N(CH₂-phenyl)₂-phenyl | 1 | ClO₄ |
| 28 | 3,4-di-CH₃-phenyl | 4-N(CH₃)₂-phenyl | 1 | I |
| 29 | 3,4-di-CH₃-phenyl | 4-N(4-CH₃-phenyl)₂-phenyl | 1 | ClO₄ |
| 30 | 3,4-di-CH₃-phenyl | 2-pyridyl | 1 | ClO₄ |
| 31 | 3,4-di-OC₂H₅-phenyl | 4-pyrrolidinyl-phenyl | 1 | ClO₄ |

As shown in FIG. 1, an optical recording medium according to the present invention can be formed by providing on a substrate 1, a recording layer 2 containing a polymethine-type dyes which is shown by the above formula (I).

Examples of the material for the substrate 1 include: plastics, such as polycarbonate, polyester, acrylic resin, polyolefine resin, phenol resin, epoxy resin, polyamide or polyimide; glass; and metals.

In forming the recording layer 2, one or more polymethine-type dyes expressed by formula (I) may be combined. Further, it is also possible to mix and disperse the compound, or stack it, with other types of coloring materials, such as polymethine-type coloring materials other than those expressed by formula (I), naphtholactam-type dyes, azulene-type, pyrylium-type, squalinium-type, croconium-type, triphenylmethane-type, xanthene-type, anthraquinone-type, cyanine-type, phthalocyanine-type, dioxazine-type, tetrahydrocholine-type, triphenothiazine-type, phenanthrene-type, or metals or metal compounds, such as Al, Te, Bi, Sn, In, Se, SnO, TeO;, As or Cd.

Polymethine compounds of the present invention can be easily obtained by synthesis methods disclosed, for example, by Bernard S. Wildi et al., "Journal of American Chemical Society" Vol. 80, 3772~3777 (1958), by H.Schmidf et al., "Liebig Annalen der Chemie" Vol. 623. pp.204~216 (1959), or by R. Wilzinger et al., "Helvetica Chimica Acta", Vo. 24, p.369 (1941).

Further, to improve the light stability of the recording layer 2, it is possible to mix a stabilizer with the recording layer 2. Examples of the stabilizer include: various metal chelate compounds, in particular, comprising Zn, Cu, Ni, Cr, Co, Mn, Pd or Zr as the central metal, and polydentate ligands, for example, four-dentate ligands, such as N4, N2O2, N2S2S4, O2S2 and O4, or combinations thereof; and various amines, diamines, nitrogen containing aromatic compounds and onium salts thereof, for example, aminium salt, diimonium salt, pyridinium salt, imidazolinium salt, and quinolium salt. Further, pyrylium salt, which is a salt of an oxygen containing aromatic compound, may be used.

In particular, aminium salt which is expressed by the following formula (IV), diimonium salt which is expressed by the following formula (V), or the like exhibits satisfactory compatibility with the polyimethine compound in the coating solution when the recording layer is formed by wet coating, thus making it possible to obtain a high-performance optical recording medium with excellent durability and light stability.

Formula (IV)

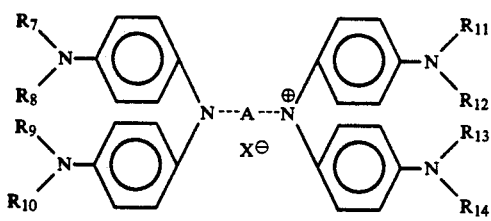

(where A represents

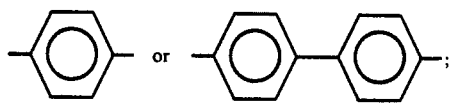

R7~R14 are substituents of a carbon number ranging from 1 to 8; at least one of R7~R14 is an alkoxyalkyl group, an alkenyl group or an alkynyl group; and $X^{\ominus}$ represents an anion.)

Formula (V)

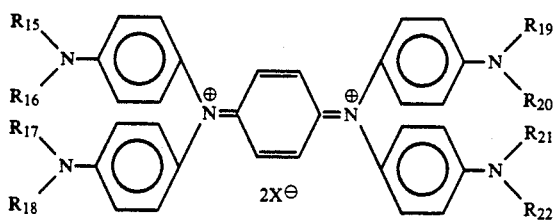

(where R15~R22 are substituents of a carbon number ranging 1 to 8; at least one of R15~R22 is an alkoxyalkyl group, an alkenyl group or an alkynyl group; and $X^{\ominus}$ represents an anion.)

The amount of such a stabilizer added to the organic coloring matter in the recording layer is preferably (1/100~50/100), in particular, (10/100~45/100) by weight with respect to the organic coloring matter.

The recording layer 2 can be formed on the substrate 1 by various methods, for example, by wet coating or chemical vapor deposition such as evaporation. When using the wet coating method, the layer can be formed by applying a solution prepared by dissolving or dispersing a polymethine compound in an organic solvent to the substrate 1. Further, in consideration of film formation characteristics and stability, a binder may be mixed with the recording layer as needed.

Various organic solvents can be used in the wet coating varies depending upon whether the polymethine compound is dispersed or dissolved. Generally speaking, the solvent used may be of an alcohol type, ketone type, amide type, ether type, ester type, aliphatic-hydrocarbon-halide type aliphatic-hydrocarbon type, fluorine type, or the like.

Ideally the polymethine compound of the present invention is completely soluble in the selected solvent.

However, when forming the recording layer directly on a resin substrate by wet coating, only an organic solvent which will not melt the surface of the resin substrate or generate cracks therein may be used.

The polymethine compound of the present invention, however, has excellent solubility in a variety of solvents. As a result, a wider range of selection for the coating solvent or for the substrate material is available when the organic coloring matter is applied to the surface of a resin substrate by wet coating. As a result, less severe process conditions for preparing an excellent optical recording medium exhibiting a low noise level are required.

Examples of the above-mentioned binder include: nitrocellulose, ethylcellulose, polystyrene, polyvinyl pyrolidone, polymethyl methacrylate, and polyamide. Further, wax, a higher fatty acid, or an amide (for example, oleylamide) may be used as an additive as needed.

The above binder can be mixed with a plasticizer, such as dioctyl phthalate, dibutyl phthalate or tricresyl phosphate, an oil solution, such as mineral oil or vegetable oil, and further, a dispersing agent, such as alkyl benzene sodium sulfonate or polyoxyethylene alkyl phenyl ether and other additives, thereby enhancing the film formation characteristics and coating stability for the recording layer.

The coating operation may be conducted by any appropriate coating method, such as immersion coating, spray coating, spinner coating, bead coating, Meyer bar coating, blade coating, curtain coating, roller coating or gravure coating.

The amount of the polymethine compound contained in the recording layer 2 is not less than 1%; usually, it ranges from 40 to 100 wt %, and more preferably, from 50 to 100 wt %. When the amount is 40 wt % or more, sufficient light absorptivity and satisfactory light reflectance with respect to a recording laser beam can be obtained for the recording layer.

The thickness of the recording layer 2 ranges from 100 Å to 20 μm, more preferably, from 200 Å to 1 μm. The film should be made as thin as possible, while providing a stable film exhibiting satisfactory light reflectance with respect to a recording laser beam.

Figure 2:
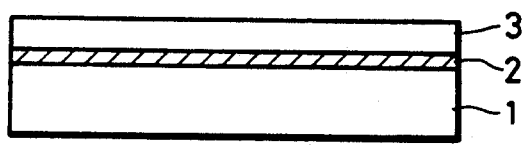
FIG. 2 is a schematic sectional view of an optical recording medium according to another embodiment of the present invention.

Further, as shown in FIG. 2, it is possible to provide a protective layer 3 which is transparent to recording and reproducing laser beams on the recording layer 2 of the optical recording medium of the present invention. The protective layer 3 may be opaque where the laser beam is applied from the side of the substrate 1.

Figure 3:
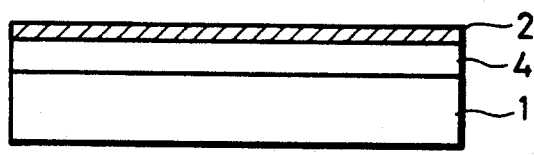
FIG. 3 is a schematic sectional view of an optical recording medium according to still another embodiment of the present invention.
Figure 4:
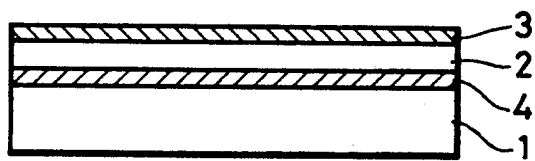
FIG. 4 is a schematic sectional view of an optical recording medium according to a further embodiment of the present invention.

Further, as shown in FIG. 3, an under-coating layer 4 may be provided between the substrate 1 and the recording layer 2. As shown in FIG. 4, it is also possible to employ both the protective layer 3 and the under-coating layer 4.

The under-coating layer 4 is formed with a view to (a) obtaining an improved adhesion for the recording layer, (b) providing a barrier to water and gas, (c) improving the stability of the recording layer, (d) improving the reflectance of the recording layer, (e) protecting the substrate from the solvent, (f) forming pregrooves, etc. To achieve the above object (a), various substances may be used, for example, a polymeric material, such as an ionomer resin, a polyamide-type resin, a vinyl-type resin, a natural high-molecular substance, silicone, or liquid rubber, or an silance coupling agent. Regarding the above objects (b) and (c), it is possible to use, apart from the above high-molecular material, an inorganic compound, such as SiO2, MgF2, SiO, TiO2, ZnO, TiN, or SiN, or a metal or a semimetal, such as Zn, Cu, S, Ni, Cr, Ge, Se, Cd, Ag, or Al. Regarding the object (d), it is possible to use a metal, such as Al or Ag, or an organic thin film having a metallic gloss, such as a cyanine dye or a methine dye. To achieve the objects (e) and (f), an ultraviolet curing resin, a thermosetting resin, or a thermoplastic resin may be used. A suitable thickness of the under-coating layer ranges from 50 Å to 100 μm, more preferably, from 200 Å to 30 μm.

The protective layer is provided to protect the recording layer from flaws, dust, contamination or the like, and improve the stability and the reflectance of the recording layer. The material of the protective layer may be the same as that of the under-coating layer. The thickness of the protective layer is not less than 100 Å, more preferably, not less than 1000 Å.

The under-coating layer and/or the protective layer may contain a polymethine-type compound as expressed by formula (I) of the present invention. Further, the under-coating layer or the protective layer may also contain a stabilizer, dispersing agent, flame retarder, lubricant, antistatic agent, surface-active agent, plasticizer or the like.

Further, in another possible construction of the optical recording medium of the present invention, two recording mediums having the same structure shown in one of FIGS. 1 to 4 are combined (in some cases, one of the two consists of a substrate only) to form an air-gap structure with the recording layers 2 positioned inside, i.e., a so-called air-sandwiched structure. Or, two recording mediums may be glued together with the recording layer 2 positioned inside, thus forming a so-called close-contact (glued) structure.

A modulated electromagnetic radiation for recording is applied to an optical recording medium (a record blank with no information recorded thereon) according to the present invention, produced as described above, so as to cause the recording layer discolorization or discoloration, or generate a recess (pit) thereon, thereby reproducing an information record on which information has been recorded.

Recording on the optical recording medium of the present invention can be effected by applying a gas laser such as a helium-neon laser (of an oscillation wavelength of 633 nm). Especially suitable, however, is a method according to which recording is effected by forming a recess on the recording layer by applying thereto a laser beam having a wavelength of 750 nm or more, and in particular, a laser beam having an oscillation wavelength which is in the near-infrared or infrared range, such as a gallium-aluminum-arsenic semiconductor laser (of an oscillation wavelength of 830 nm). To perform reading, a laser beam of a type as mentioned above which have been adjusted to such an intensity as will not cause any change in the recording layer may be used. Further, it is also possible to conduct writing and reading by using lasers of the same wavelength or lasers having different wavelengths.

As described above, in accordance with the present invention, long-wavelength absorptivity is obtained in the recording layer. Accordingly, high-sensitivity recording is possible even when a long-wavelength oscillation laser, such as a semiconductor laser, is used thus making it possible to obtain an optical recording medium exhibiting a high C/N ratio.

Further, in accordance with the present invention, the noise level is always low, even when the recording layer is formed by wet coating. Moreover, it is possible to obtain an optical recording medium with excellent heat stability.

EXAMPLES

The present invention will now be described in detail with reference to specific examples, which, however, should not be construed restrictively.

Synthesis Example 1

A polymethine compound according to the present invention, compound No.(5), was synthesized in the following manner:

4.4 g of 4,4'-diaminobenzophenon, 30.9 g of P-iodotoluene, 19.5 g of potassium carbonate anhydride and 10 g of copper powder were added to 70 ml of o-dichlorobenzene, and the mixture thus obtained was refluxed with stirring for twenty-four hours at 180° C. After the reaction, the mixture was filtered and washed with ethyl acetate. Then, the mixture was separated by silica gel column chromatography using chloroform, thereby obtaining 11.3 g of 4,4'-ditolylaminobenzophenon.

Subsequently, 9 g of the 4,4'-ditolylaminobenzophenon was reacted with 15.7 g of an ether solution (2 mol/l) of methylmagnesium iodide in 72 ml of tetrahydrofuran for sixteen hours at 60° C.

Next, this reaction liquid was processed by adding thereto dilute hydrochloric acid and an aqueous solution of sodium hydroxide. It was then filtered and washed with water and recrystallized in ethanol, thereby obtaining 7.1 g of 1,1-bis(p-ditolylaminophenyl)-ethylene. Subsequently, 7 g of the 1,1-bis(p-ditolylaminophenyl)-ethylene and 2.5 ml of ethyl orthoformate were dissolved in 25 ml of acetic anhydride, and while the solution was being cooled with ice, a liquid mixture of 1.5 ml of perchloric acid and 25 ml of acetic anhydride was added dropwise thereto. The resulting solution was then made to react for two hours at 90° C. Afterwards, 700 ml of isopropyl ether was added to the reaction liquid to precipitate the reaction product. Subsequently, the crystals were separated by filtration and washed with isopropyl ether and water. The precipitate was recrystallized in a mixture of acetone and methanol to obtain, after drying, 7.2 g of polymethine compound No.(5).

The compound No.(5), synthesized in the manner described above, exhibited, in acetonitrile, a maximum absorptivity to light having a wavelength of 848.2 nm, which is in the near infrared range. The yield was 35 %.

Elementary analysis values (C85H75N4ClO4),

| Analysis values: | C: 81.56% | H: 6.02% | N: 4.46% |
|---|---|---|---|
| (Theoretical values: | C: 81.54% | H: 6.04% | N: 4.48%) |

Example 1

A solution was prepared by dissolving 3 parts by weight of the polymethine dye compound No.(5) in 97 parts by weight of diacetone alcohol, and this solution was applied, by spinner coating, to polycarbonate (hereinafter referred to as "PC") substrate having a diameter of 130 mm and a thickness of 1.2 mm and equipped with pregrooves formed by injection molding. Then, after drying, an organic thin-film recording layer having a thickness of 800 Å was obtained. Further, two substrates were glued together by using an ultraviolet (UV) curing resin, using a spacer having a thickness of 0.3 mm, thereby obtaining an optical recording medium of an air-sandwiched structure.

The optical recording medium, prepared in this way, was attached to a turn table, which was rotated by a motor at 1800 rpm. While the optical recording medium was being thus rotated, a laser beam was applied to the recording layer from the side of the substrate, by using a semiconductor laser having an oscillation wavelength of 830 nm, in a spot size of 1.5 μm, with a recording power of 8 mW and at a recording frequency of 3 MHz, so as to form a pit on the recording layer, thereby writing information onto it. The information was reproduced by using same laser with a reading power of 0.6 mW, and the reproduction waveform thereof was analyzed by spectral analysis (using a scanning filter; band width: 30 KHz) to measure the C/N ratio.

Then, the information recorded under the above conditions was reproduced $10^5$ times. After that, the C/N ratio was measured.

Further, a recording medium prepared in the same manner was left to stand for 2000 hours at 65° C. and 85% RH so as to test the medium for environmental stability. Then, the transmittance (measured with respect to a 830 nm laser) and C/N ratio after that were measured. The measurement results are given in Table 1.

Examples 2~5

Optical recording mediums of Examples 2 to 5 were prepared in the same manner as in Example 1 except that polymethine-type dye compounds No.(3), (4), (14) and (29) were used instead of compound No.(5).

The optical recording mediums of Examples 2 to 5 thus obtained were measured in the same manner as in Example 1. The measurement results are given in Table 1.

TABLE 1

| | | Initial stage | | Reproduction repeated $10^5$ times | Environmental preservation stability 65° C., 85% RH approx. 2000 hrs. | |
|---|---|---|---|---|---|---|
| | Compound No. | Trans-mittance (%) | C/N ratio (dB) | C/N ratio (dB) | Trans-mittance (%) | C/N ratio (dB) |
| Ex. 1 | (5) | 22.6 | 55 | 53 | 24.3 | 53 |
| Ex. 2 | (3) | 20.4 | 55 | 52 | 22.8 | 53 |
| Ex. 3 | (4) | 19.8 | 56 | 54 | 21.3 | 52 |
| Ex. 4 | (14) | 18.6 | 55 | 52 | 22.0 | 51 |
| Ex. 5 | (29) | 21.5 | 54 | 52 | 23.3 | 52 |

Examples 6 and 7

The following compounds, No.32 and 33, were respectively mixed with the polymethine-type dye compound No.(5), each in a ratio by weight of 1:2, in diacetone alcohol. The solutions thus prepared were applied to substrates in the same manner as in Example 1 to form organic thin-film recording layers having a thickness of 850 Å after drying, thereby preparing optical recording mediums of Examples 6 and 7.

The recording mediums of Examples 6 and 7, prepared in this way, were measured in the same manner as in Example 1. The measurement results are given in Table 2.

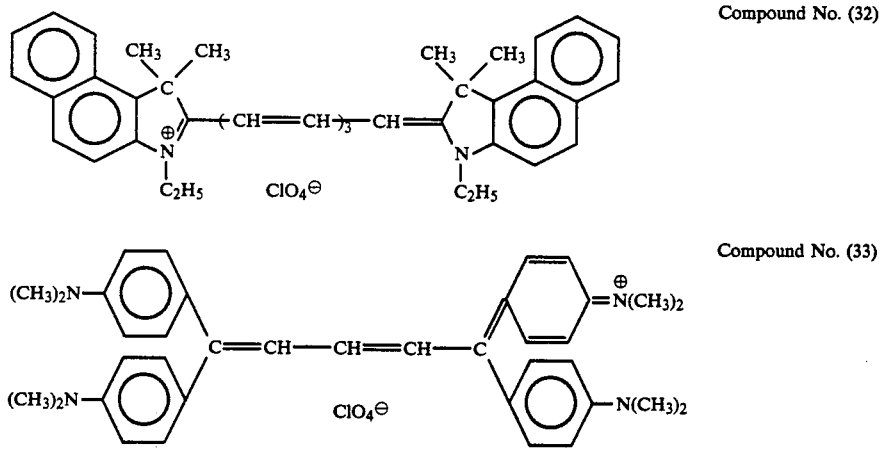

Compound No. (32)

Compound No. (33)

Comparative Examples 1 and 2

Optical recording mediums were prepared in the same manner as in Examples 6 and 7 except that the compound No.(5), used in Examples 6 and 7, was excluded. The optical recording mediums thus prepared were measured in the same manner as in the above examples. The measurement results are given in Table 2.

TABLE 2

| Compound No. | | Initial stage | | Reproduction repeated $10^5$ times | Environmental preservation stability 65° C., 85% RH approx. 2000 hrs. | |
|---|---|---|---|---|---|---|
| | | Trans-mittance (%) | C/N ratio (dB) | C/N ratio (dB) | Trans-mittance (%) | C/N ratio (dB) |
| Ex. 6 | (5), (32) | 21.5 | 53 | 50 | 26.9 | 48 |
| Ex. 7 | (5), (32) | 20.4 | 54 | 51 | 24.0 | 50 |
| Comp. Ex. 1 | (32) | 22.1 | 50 | 45 | 34.2 | 39 |
| Comp. Ex. 2 | (33) | 19.8 | 54 | 49 | 25.0 | 47 |

Example 8

A solution was prepared by mixing 2 parts by weight of compound No.(2) and 1 part by weight of a nitrocellulose resin (Ohareslacker manufactured by Daiseru Kagaku Kabushiki-Kaisha) with 97 parts by weight of diacetone alcohol. This solution was applied, by spinner coating, to a PC substrate having a diameter of 130 mm and a thickness of 1.2 mm and equipped with pregrooves formed by injection molding, thereby obtaining an organic thin-film recording layer having a thickness of 1000 Å after drying.

The optical recording medium, prepared in this way, was measured in the same manner as in Example 1. The measurement results are given in Table 3.

Example 9

An optical recording medium was prepared in the same manner as in Example 8, using compound No.(23) instead of the compound No.(2) used in Example 8.

The optical recording medium of Example 9, prepared in this way, was measured in the same manner as in Example 1. The measurement results are given in Table 3.

direction, and a laser beam of a semiconductor laser having an oscillation wavelength of 830 nm was applied to the optical card from the side of the 0.4 mm thick PC substrate, in a spot size of 3.0 m, with a recording power of 3.5 mW, and in response to recording pulses of 50 μsec, thereby writing information onto the card in the Y-direction. The information, recorded in this way, was reproduced with a reading power of 0.3 mW to measure the contrast ratio:

$(\frac{A - B}{A} : A =$ RF signal strength of the unrecorded portion, and $B =$ RF signal strength of the recorded portion)

A recording medium prepared under the above conditions was tested for environmental preservation stability under the same measurement conditions as in Example 1, and the transmittance and contrast ratio were measured. Further, a recording medium prepared under the above conditions was subjected to fade-meter light stability test (for 10 hours) to measure the transmittance thereof. The measurement results are given in Table 4.

Example 11

TABLE 3

| Compound No. | | Initial stage | | Reproduction repeated $10^5$ times | Environmental preservation stability 65° C., 85% RH approx. 2000 hrs. | |
|---|---|---|---|---|---|---|
| | | Trans-mittance (%) | C/N ratio (dB) | C/N ratio (dB) | Trans-mittance (%) | C/N ratio (dB) |
| Ex. 8 | (2) | 23.2 | 54 | 51 | 25.6 | 51 |
| Ex. 9 | (23) | 22.5 | 54 | 52 | 24.7 | 52 |

Example 10

Pregrooves were formed, by the heat press method, on a PC substrate of a wallet size having a thickness of 0.4 mm. and a solution prepared by mixing 3 parts by weight of the polymethine-type dye compound No.(5) with 97 parts by weight of diacetone alcohol was applied to the surface of the substrate by the bar coating method. After drying, an organic thin-film recording layer having a thickness of 1000 Å was obtained. Further, a PC substrate of a wallet size having a thickness of 0.3 mm was brought into close contact with the above substrate by the heat roll method using an ethylene-vinyl acetate film, thereby preparing an optical card of a close-contact structure.

The optical recording medium, prepared in this way, was attached to a stage adapted to be driven in the X-Y A recording medium was prepared in the same manner as in Example 10 except that compound No.(2) was used instead of the compound No.(5) used in Example 10. The optical recording medium of Example 11, thus prepared, was measured in the same manner as in Example 10. The measurement results are given in Table 4.

Comparative Examples 3 and 4

Recording mediums were prepared in the same manner as in Example 10 except that compounds No.(32) and (33) were used instead of the compound No.(5) used in Example 10. The optical recording mediums thus prepared were measured in the same manner as in Example 10. The measurement results are given in Table 4.

TABLE 4

| Compound No. | | Initial stage | | Environmental preservation stability 65° C., 85% RH after 2000 hrs. | | Fade-meter light stability test after 10 hrs. |
|---|---|---|---|---|---|---|
| | | Trans-mittance (%) | Contrast ratio (dB) | Trans-mittance (%) | Contrast ratio (dB) | Transmittance (%) |
| Ex. 10 | (5) | 19.7 | 0.62 | 21.5 | 0.60 | 30.4 |
| Ex. 11 | (2) | 21.3 | 0.62 | 23.5 | 0.60 | 36.8 |
| Comp. Ex. 3 | (32) | 20.7 | 0.55 | 31.4 | 0.42 | 89.3 |
| Comp. Ex. 4 | (33) | 18.5 | 0.59 | 24.7 | 0.49 | 65.4 |

Example 12

An Optical card was prepared in the same manner as that of Example 10 except that the coating solution for forming the recording layer was prepared by mixing 2.4 parts by weight of the above polymethine compound No.(5) and 0.6 parts by weight of a stabilizer which can be expressed by the following formula (34) with 97 parts by weight of diacetone alcohol. The optical card, prepared in this way, was measured for the transmittance and contrast ratio both in the initial stage and after being allowed to stand for 2000 hours under the conditions of 65° C. and 85% RH, and for the transmittance after a fade-meter light stability test (lasting 100 hours). The results of the measurement are given in Table 5.

2,2,3,3-tetrafluoropropanol. Then, this coating solution was applied to the sides of the above optical-card substrates having the pregrooves by the roll coating method, thereby forming recording layers. The process was repeated in succession on 100 optical-card substrates. Next, PC protective substrates having a thickness of 0.3 mm were glued to the recording layers using hot-melt adhesive sheets of an ethylene-vinyl-acetate-copolymer type, thereby producing optical cards.

Reproduction was performed on the first and the 100-th of the optical cards, prepared in this way, by using an optical-card recording/reproducing apparatus (manufactured by Canon Inc.), and the signal waveforms thereof were observed to measure the noise levels of the optical cards at 70 KHz (video band width: 1 KHz). The measurement results are given in Table 6.

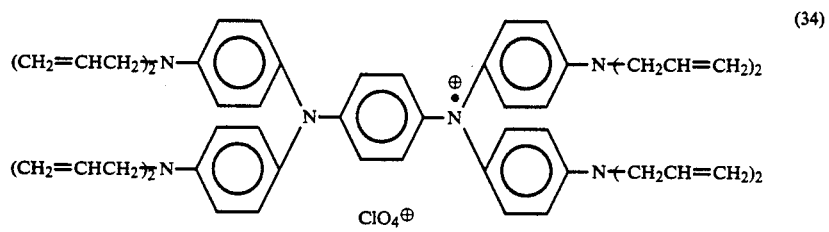

(34)

TABLE 5

| Compound No. | | Initial stage | | Environmental preservation stability 65° C., 85% RH after 2000 hrs. | | Fade-meter light stability test after 100 hrs. |
|---|---|---|---|---|---|---|
| | | Trans-mittance (%) | Contrast ratio (dB) | Trans-mittance (%) | Contrast ratio (dB) | Transmittance (%) |
| Ex. 12 | (5), (34) | 20.5 | 0.60 | 22.1 | 0.58 | 22.4 |

Examples 13 and 14

PC substrates of a wallet size (85 mm × 54 mm) having a thickness of 0.4 mm and equipped with stripe-like pregrooves formed by the 2P method and having a width of 3 μm, a pitch of 12 μm and a depth of 3000 Å, were prepared as substrates for optical cards.

Further, a coating solution for forming recording layers was prepared by dissolving the polymethine dye compound No.(5) and (24) of the present invention in

Comparative Examples 5 and 6

Optical cards were prepared in the same manner as in Examples 13 and 14 except that compounds which can be expressed by the following formulas (35) and (36) were used instead of the polymethine compounds (5) and (24) of Examples 13 and 14, and were measured in the same manner. The results of the measurement are given in Table 6.

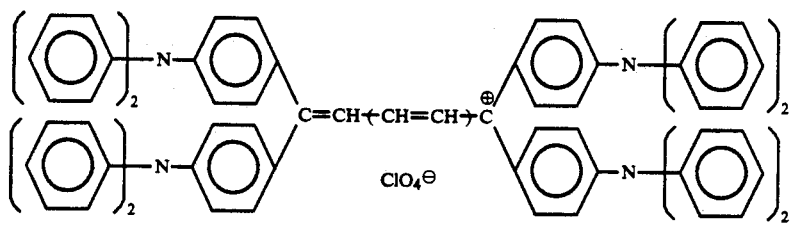
(35)

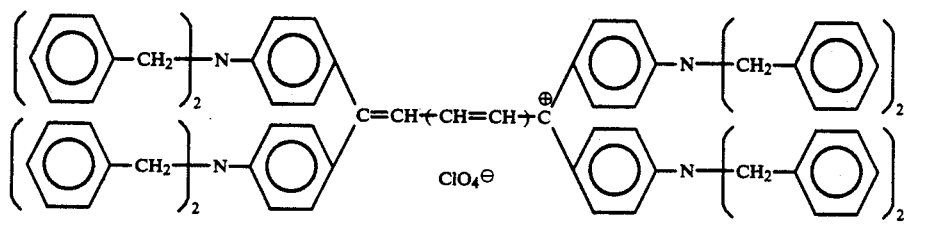
(36)

TABLE 6

| Compound No. | | Noise level (dBm) | |
| --- | --- | --- | --- |
| | | First card | 100-th card |
| Ex. 13 | (5) | −80.7 | −80.5 |
| Ex. 14 | (24) | −79.8 | −79.6 |
| Comp. Ex. 5 | (35) | −63.2 | −49.8 |
| Comp. Ex. 6 | (36) | −68.5 | −56.1 |

As can be seen from Table 6, the 100-th optical cards in Examples 13 and 14 are little changed in noise level as compared to the first optical cards, whereas the noise levels of the 100-th optical cards in Comparative Examples 1 and 2 have been remarkably raised as compared to those of the first optical cards.

It is assumed that this is attributable to the fact that the polymethine-type dye compounds used in Comparative Examples 5 and 6 did not have satisfactory solubility in solvent. That is, when recording layers were formed by applying the coating solution to a plurality of substrates, even a slight change in concentration of the solution was enough to cause crystallization of minute crystals of the pigment compounds in the solution. Such crystallization was transferred to the substrates, resulting in an increase in noise level.

The polymethine-type compounds of Examples 13 and 14, in contrast, had high solubility in solvent, so that it is hard for crystallization to occur in the coating solution if there is some change in concentration of the solution. Accordingly, it is to be assumed that the recording layers are protected from being mixed with solid particles thus making it possible to always obtain optical cards having a low noise level.

What is claimed is:

1. An optical recording medium comprising: a substrate and a recording layer, said recording layer having a thickness of 100 Å to 20 microns and comprising from 40 to 100 weight percent of a polymethine compound which can be expressed by the following formula:

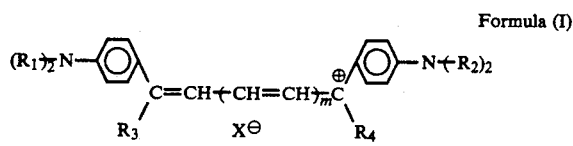
Formula (I)

where $R_1$ and $R_2$ represent aryl groups substituted by alkyl groups, or aryl groups substituted by alkoxy groups; $R_3$ and $R_4$ represent substituted or unsubstituted aryl groups, substituted or unsubstituted heterocyclic groups, or substituted or unsubstituted styryl groups; m is 0, 1 or 2; and $X^\ominus$ represents an anion.

2. An optical recording medium according to claim 1, wherein said recording layer is formed by wet coating.

3. An optical recording medium according to claim 1, wherein R1 and R2 in formula (I) are aryl groups which can be expressed by the following formula (II), in which R5 is a substituted or unsubstituted lower alkyl group of a carbon number ranging from 1 to 3:

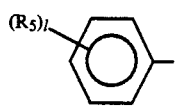
Formula (II)

(l: 1~3)

4. An optical recording medium according to claim 3, wherein R5 in formula (II) is a methyl group.

5. An optical recording medium according to claim 1, wherein R1 and R2 in formula (I) are aryl groups which can be expressed by the following formula (III), in which R6 is a substituted or unsubstituted lower alkoxy group of a carbon number ranging from 1 to 3:

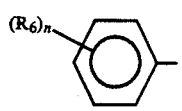
Formula (III)

(n: 1~3)

6. An optical recording medium according to claim 5, wherein R6 in formula (III) is a methoxy group.

7. An optical recording medium according to claim 1, wherein said recording layer further comprises a stabilizer added in an amount of from about 1/100–50/100 by weight with respect to said polymethine compound.

8. An optical recording medium according to claim 7, wherein said stabilizer contains at least one compound which can be expressed by one of the following formulas (IV) or (V):

Formula (IV)

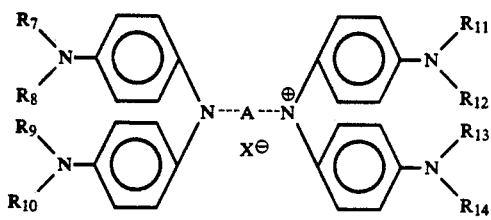

where A represents

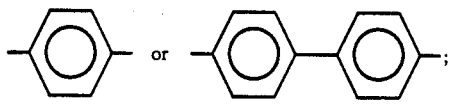

R7~R14 are substituents of a carbon number ranging from 1 to 8; at least one of R7~R14 is an alkoxy alkyl group, an alkenyl group or an alkynyl group; and $X^\ominus$ represents an anion Formula (V)

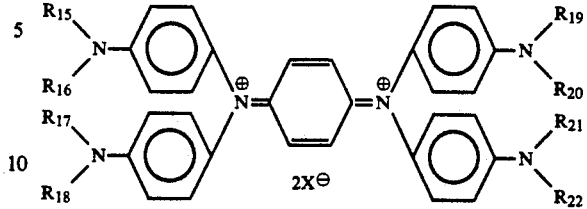

where R15~R22 are substituents of a carbon number ranging from 1 to 8; at least one of R15~R22 is an alkoxyalkyl group, an alkenyl group or an alkynyl group; and $X^\ominus$ represents an anion.

9. An optical recording medium according to claim 1, wherein said optical recording medium is a record blank.

10. An optical recording medium according to claim 1, wherein said optical recording medium is an information record on which information is recorded by forming a pit on said recording layer by applying a recording light beam thereto.

11. An optical recording medium according to claim 1, wherein an under-coating layer having a thickness of from about 50 Å to about 100 microns is provided between said substrate and said recording layer.

12. An optical recording medium according to claim 1, wherein a protective layer of at least about 100 Å thickness is provided on said recording layer.

* * * * *

UNITED STATES PATENT AND TRADEMARK OFFICE
CERTIFICATE OF CORRECTION

PATENT NO. : 5,271,979

DATED : December 21, 1993

INVENTOR(S) : Santoh et al.

Page 1 of 4

It is certified that error appears in the above-indentified patent and that said Letters Patent is hereby corrected as shown below:

COLUMN 1:

Line 36, "bithmuth" should read --bismuth--.

COLUMN 2:

Line 39, "R1 and R2" should read --$R_1$ and $R_2$--; and
Line 41, "R3 and R4" should read --$R_3$ and $R_4$--.

COLUMN 3:

Line 23, "R1 and R2" should read --$R_1$ and $R_2$--;
Line 44, "R5" should read --$R_5$--; and
Line 67, "R" should read --$R_6$--.

COLUMN 4:

Line 3, "R5 and R6" should read --$R_5$ and $R_6$--;
Line 8, "iting" should read --it--; and
Line 18, "R3 and R4" should read --$R_3$ and $R_4$--.

COLUMN 9:

Line 45, "dyes" should read --dye--;
Line 63, "TeO;," should read --$TeO_2$,--; and
Line 68, "H.Schmidf" should read --H. Schmidt--.

UNITED STATES PATENT AND TRADEMARK OFFICE
CERTIFICATE OF CORRECTION

PATENT NO. : 5,271,979
DATED : December 21, 1993
INVENTOR(S) : Santoh et al.

It is certified that error appears in the above-indentified patent and that said Letters Patent is hereby corrected as shown below:

COLUMN 10:

Line 46, "R. Wilzinger" should read --R. Wizinger--;
Line 47, "Vo." should read --Vol.--; and "(1941)." should read --(1943).--;
Line 54, "N4, N2O2, N2S2S4, O2S2 and O4," should read --$N_4$, $N_2O_2$, $N_2S_2S_4$, $O_2S_2$ and $O_4$,--; and
Line 64, "polyimethine" should read --polymethine--.

COLUMN 11:

Line 20, "R7~R14" should read --$R_7$~$R_{14}$--;
Line 21, "R7~R14" should read --$R_7$~$R_{14}$--;
Line 36, "R15~R22" should read --$R_{15}$~$R_{22}$--;
Line 37, "ranging" should read --ranging from--; and "R15~R22" should read --$R_{15}$~$R_{22}$--; and
Line 53, "Various" should read --The--; and "solvents can" should read --solvent to--.

COLUMN 12:

Line 27 "100 wt %," should read --100 wt. %,--;
Line 28, 100 wt %." should read --100 wt. %.--; and "40 wt %" should read --40 wt. %--;
Line 59, "an silance" should read --a silane--; and
Line 62, "SiO2, MgF2," should read --$SiO_2$, $MgF_2$,--; and "TiO2," should read --$TiO_2$,--.

UNITED STATES PATENT AND TRADEMARK OFFICE
CERTIFICATE OF CORRECTION

PATENT NO. : 5,271,979
DATED : December 21, 1993
INVENTOR(S) : Santoh et al.

It is certified that error appears in the above-indentified patent and that said Letters Patent is hereby corrected as shown below:

COLUMN 13:

Line 51, "have" should read --has--.

COLUMN 14:

Line 48, "(C85H75N4ClO4)" should read --$(C_{85}H_{75}N_4ClO_4)$--.

COLUMN 18:

Line 19, "3.0 m," should read --3.0 $\mu$m,--.

COLUMN 19:

Line 19, "Optical" should read --optical--.

COLUMN 22:

Line 32, "R1 and R2" should read --$R_1$ and $R_2$--;
Line 34, "R5" should read --$R_5$--;
Line 45, "R5" should read --$R_5$--;
Line 47, "R1 and R2" should read --$R_1$ and $R_2$--;
Line 49, "R6" should read --$R_6$--; and
Line 60, "R6" should read --$R_6$--.

UNITED STATES PATENT AND TRADEMARK OFFICE
CERTIFICATE OF CORRECTION

PATENT NO. : 5,271,979
DATED : December 21, 1993
INVENTOR(S) : Santoh et al.

It is certified that error appears in the above-indentified patent and that said Letters Patent is hereby corrected as shown below:

COLUMN 23:

Line 26, "R7~14" should read --$R_7$~$R_{14}$--; and
Line 28, "R7~14" should read --$R_7$~$R_{14}$--.

COLUMN 24:

Line 13, "R15~22" should read --$R_{15}$~$R_{22}$--;
Line 14, "R15~22" should read --$R_{15}$~$R_{22}$--; and
Line 15, "alkoxyalkyl" should read --alkoxy alkyl--.

Signed and Sealed this

Twenty-sixth Day of July, 1994

BRUCE LEHMAN

*Attest:*

*Attesting Officer*    Commissioner of Patents and Trademarks